(12) United States Patent
Castellano Aldave et al.

(10) Patent No.: US 11,772,787 B2
(45) Date of Patent: Oct. 3, 2023

(54) UNMANNED AERIAL VEHICLE WITH DIFFERENT FLIGHT MODES

(71) Applicant: FUVEX CIVIL, SL, Sarriguren (ES)

(72) Inventors: Jesús Carlos Castellano Aldave, Fontellas (ES); Jesús Villadangos Alonso, Sarriguren (ES); José Javier Astrain Escola, Baranain (ES)

(73) Assignee: FUVEX CIVIL, SL, Sarriguren (ES)

( * ) Notice: Subject to any disclaimer, the term of this patent is extended or adjusted under 35 U.S.C. 154(b) by 443 days.

(21) Appl. No.: 17/264,292

(22) PCT Filed: Jul. 17, 2019

(86) PCT No.: PCT/EP2019/069241
§ 371 (c)(1),
(2) Date: Jan. 28, 2021

(87) PCT Pub. No.: WO2020/025323
PCT Pub. Date: Feb. 6, 2020

(65) Prior Publication Data
US 2021/0171191 A1    Jun. 10, 2021

(30) Foreign Application Priority Data
Aug. 3, 2018   (EP) .................................... 18382588

(51) Int. Cl.
*B64C 29/00*   (2006.01)
*B64C 39/02*   (2023.01)
(Continued)

(52) U.S. Cl.
CPC ........ *B64C 29/0033* (2013.01); *B64C 39/024* (2013.01); *B64C 27/28* (2013.01);
(Continued)

(58) Field of Classification Search
CPC ... B64C 29/0033; B64C 39/024; B64C 27/28; B64C 27/10; B64C 3/38; B64C 39/005;
(Continued)

(56) References Cited

U.S. PATENT DOCUMENTS 2,708,081 A * 5/1955 Dobson ............... B64C 29/0033
D12/326
3,231,221 A * 1/1966 Platt .................... B64C 29/0033
244/66
(Continued)

FOREIGN PATENT DOCUMENTS

CN        104 925 247 A0    9/2015
CN        204 979 219 U     1/2016
(Continued)

*Primary Examiner* — Medhat Badawi
(74) *Attorney, Agent, or Firm* — Robert J. Hess; Hess Patent Law Firm

(57) ABSTRACT

The unmanned aerial vehicle, UAV, has a fuselage (1) with at least one rotating shaft (2) and one wing (3) positioned on the rotating shaft (2), protruding from either side of the fuselage (1). Preferably, the UAV has at least one rotor propeller (4) arranged on each rotating shaft (2), on either side of the fuselage (1), with one or more rotor blades (4a) and a housing (4b), which includes an actuator. The UAV is capable of shifting between a first flight mode using rotatable wings that rotate freely around the rotating shaft (2) only due to a direction and strength of wind impinging against a surface of the wings (3) and a downstream flow generated by the rotor propellers (4), and a second flight mode using fixed wings, kept in a predetermined position by a wing-locking mechanism, preferably a substantially horizontal position.

14 Claims, 3 Drawing Sheets

(51) Int. Cl.
*B64C 27/28* (2006.01)
*B64U 30/10* (2023.01)
*B64U 30/20* (2023.01)
*B64U 50/19* (2023.01)
*B64U 70/80* (2023.01)

(52) U.S. Cl.
CPC .............. *B64U 30/10* (2023.01); *B64U 30/20* (2023.01); *B64U 50/19* (2023.01); *B64U 70/80* (2023.01)

(58) Field of Classification Search
CPC ........ B64U 10/13; B64U 30/10; B64U 30/20; B64U 50/19; B64U 70/80
See application file for complete search history.

(56) References Cited

U.S. PATENT DOCUMENTS

| | | | | |
|---|---|---|---|---|
| 5,096,140 | A * | 3/1992 | Dornier, Jr. ......... | B64C 29/0033 244/12.4 |
| 8,342,441 | B2 * | 1/2013 | Yoeli ....................... | B64C 27/20 244/17.11 |
| 9,045,226 | B2 * | 6/2015 | Piasecki ................. | B64C 27/32 |
| 9,254,916 | B2 * | 2/2016 | Yang ........................ | B64C 3/546 |
| 9,944,386 | B1 * | 4/2018 | Reichert ................. | B64C 25/54 |
| 10,086,931 | B2 * | 10/2018 | Reichert ................. | B64D 27/24 |
| 10,220,944 | B2 * | 3/2019 | McCullough ........... | B64C 39/06 |
| 10,315,761 | B2 * | 6/2019 | McCullough ........... | B64C 29/02 |
| 10,618,649 | B2 * | 4/2020 | Champagne, Jr. .... | B64C 39/024 |
| 10,633,087 | B2 * | 4/2020 | McCullough ....... | B64C 29/0025 |
| 11,053,000 | B2 * | 7/2021 | Castellano Aldave ...................... B64C 29/0016 |
| 11,254,430 | B2 * | 2/2022 | Regev ..................... | B64C 27/20 |
| 11,530,028 | B1 * | 12/2022 | Wiegman ................. | B64C 13/04 |
| 2003/0094537 | A1 * | 5/2003 | Austen-Brown ... | B64C 29/0033 244/7 R |
| 2012/0261523 | A1 * | 10/2012 | Shaw ................... | B64C 29/0033 244/7 R |
| 2014/0008498 | A1 * | 1/2014 | Reiter ................... | B64C 39/024 244/99.11 |
| 2015/0136897 | A1 * | 5/2015 | Seibel ................... | B64C 39/024 244/6 |
| 2015/0175260 | A1 * | 6/2015 | Hesselbarth ........ | B64C 29/0033 244/7 A |
| 2016/0244157 | A1 * | 8/2016 | Welsh .................... | B62D 63/04 |
| 2017/0247107 | A1 * | 8/2017 | Hauer ................... | B64C 39/024 |
| 2017/0274984 | A1 * | 9/2017 | Beckman ................ | B64C 11/48 |
| 2018/0086442 | A1 * | 3/2018 | Regev .................... | B64C 39/024 |
| 2018/0215465 | A1 * | 8/2018 | Renteria ................. | B64C 25/10 |
| 2018/0281941 | A1 * | 10/2018 | Hutson .................. | B64C 39/024 |
| 2019/0135420 | A1 * | 5/2019 | Regev .................. | B64C 29/0033 |
| 2019/0152593 | A1 * | 5/2019 | Castellano Aldave ...................... B64C 29/0033 |
| 2020/0140080 | A1 * | 5/2020 | Regev .................... | B64C 39/024 |
| 2020/0333779 | A1 * | 10/2020 | Regev .................... | B64C 39/08 |
| 2021/0024213 | A1 * | 1/2021 | Regev ....................... | B64C 3/38 |
| 2021/0171191 | A1 * | 6/2021 | Castellano Aldave ...................... B64C 39/024 |

FOREIGN PATENT DOCUMENTS

| | | |
|---|---|---|
| WO | WO 2016/035068 A2 | 3/2016 |
| WO | WO 2016/120833 A1 | 8/2016 |
| WO | WO 20200025323 | 2/2020 |

\* cited by examiner

UNMANNED AERIAL VEHICLE WITH DIFFERENT FLIGHT MODES

TECHNICAL FIELD

The present invention discloses a convertible unmanned aerial vehicle, also used in the abbreviated form UAV, with tilt-rotor and tilt-wing characteristics, where the term unmanned aerial vehicle is also known commonly as a drone or an unmanned aircraft.

Moreover, the present invention discloses a UAV capable of modifying its flight mode configuration between a first flight mode using rotor propellers to generate lift whilst keeping the wings free to rotate, tilt or revolve around their own longitudinal axis (transversal to the vehicle fuselage) and, a second flight mode using propellers to push the aircraft forward in a horizontal direction while the main wings remain fixed in a lift generation position, also known as convertiplane.

STATE OF THE ART

The concept of a tilt-rotor aircraft arose initially in the first decades of the 1900s and refers to aircraft capable of repositioning the rotor propellers or proprotors arranged on wings, usually fixed wings, allowing the aircraft to manoeuvre in a horizontal or vertical (hovering) direction, as well as also being suitable for vertical take-off and landing (VTOL). The first modern prototypes and models were produced during the 1950s and 1960s applied to manned aircraft vehicles, especially military aircraft.

US patent application 2015/136,897 discloses a fixed wing unmanned aerial vehicle comprising a plurality of propellers, arranged on the cited wing, which can be pivoted between a vertical and horizontal position through the use of a pivoting mechanism On the other hand, the term tilt-wing is used to describe aircraft capable of rotating its wings, in a similar manner as the rotor propellers in a tilt-rotor aircraft, so that the aircraft is capable of conventional forward flight or hovering, as well as conventional or vertical take-off and landing. As is the case with the first tilt-rotor aircrafts, the first modern prototypes and models were also produced during the 1950s and 1960s applied to manned aircraft, especially military aircraft.

U.S. Pat. No. 2,708,081 discloses an aircraft comprising a fuselage, a wing on either side of the fuselage with propellers and power units arranged on the outer ends of the wings and means for rotating the wings around an axis relative to the fuselage.

However, tilt-wing aircraft vehicles designed for either manned or unmanned navigation, present a serious drawback in their design when the fixed wings are positioned vertically in a hover mode as well as during vertical take-off and landing, as the surface area of the wing is at its maximum exposure to crossover winds which reduces the aerodynamic properties of the aircraft and increases the drag effect, therefore reducing the lift effect.

These concepts, initially applied to manned aircraft vehicles, have been adjusted and extrapolated to unmanned aerial vehicles, such as drones, and therefore there is a wide range of tilt-rotor and tilt-wing UAVs available in the market.

Patent application WO2016/120,833 discloses a tilt-rotor drone which comprises a fuselage, a couple of wings connected to the fuselage having a longitudinal axis "X", so that each wing rotates around the longitudinal axis "X" with respect to the fuselage. The drone includes multiple rotors, each rotor connected to a wing and configured to rotate around longitudinal axis "X", and each rotor comprising at least one blade rotating around a rotation axis "Y", substantially orthogonal to longitudinal axis "X". However, this document doesn't solve the issue regarding crossover winds colliding or impacting against wings in a vertical position.

Patent application WO2016/035,068 discloses a multirotor aircraft having a chassis with one or more engines, one or more free wings and an actuator, wherein the one or more free wings are attached to said chassis by an axial connection so that the angle of the free wing changes relative to said chassis due to the flow of air over said wing. The one or more free wings can rotate independently and may include control surfaces or a movement-limiting device.

Chinese patent application no. 104925247 discloses a multi-propeller forward-tilting helicopter having a body, a main propeller, a main propeller rotary shaft and an empennage, wherein a wing, composed of a fixed wing body, a movable wing body and a rotary shaft, is horizontally and transversely installed on the lower portion of the helicopter body, with secondary propellers installed on two sides of said wing. The movable wing body is connected with the fixed wing body through the rotary shaft in an overturning mode, and the secondary propellers are in transmission connection with the rotary shaft through respective gear transmission mechanisms.

Chinese utility model no. 204979219 discloses a four propeller tiltrotor, having a fuselage with front and rear wings coupled to said fuselage with respective rotating shafts. Each wing has a deflector portion, each one of said deflector portions having one of the four propellers fastened to it, and rotating synchronously with its respective rotating shaft.

The present invention aims to overcome the cited problems, as well as providing a UAV which is readily stored or assembled due to the particular design of the different components.

BRIEF DESCRIPTION OF THE INVENTION

The present invention discloses an aircraft, specifically an unmanned aerial vehicle (hereafter UAV or drone) capable of shifting between a first flight mode using rotary wings, and a second flight mode using fixed wings, the UAV comprising a fuselage, which defines a longitudinal axis "Y" along the centre of gravity of the UAV and parallel to said fuselage, with one or more rotating shafts protruding from two opposite sides of the fuselage along a transversal longitudinal axis "X", perpendicular to longitudinal axis "Y", with one or more wings on either side of the fuselage arranged on the rotating shaft, so that the wings rotate with regards to the fuselage around the rotating shaft defined by the longitudinal axis "X".

Rotor propellers are arranged on either side of the fuselage on the one or more rotating shafts, preferably with at least one rotor propeller per wing. Each rotor propeller comprises a plurality of rotating blades powered by an engine, or an alternative power source, enclosed in a casing mounted on the rotor shaft. Propeller blades are usually made of wood, metal or polymeric composites, wherein the latter may or may not include reinforcements such as carbon fibres.

The wings of the UAV, disclosed herein, are characterised in that they have a particular design. Each one of the wings is made up of a front detachable component and a rear detachable component, both of them mounted around the at least one rotating shaft, so that the front detachable component defines a leading edge of each wing and the rear detachable component defines a trailing edge of each wing. It should be noted that the front detachable component, the rear detachable component or both of them may be made up of one or more parts. When the components of each wing are assembled together, they include at least one cut-out portion, suitable for adequately surrounding the casing of the rotor propeller arranged on the rotating shaft, as well as allowing each of the rotor propellers to rotate freely in conjunction with the rotation of the rotating shaft on which it has been installed or arranged between said first and second flight modes, without risk of collision with the wings.

The front and rear detachable components are assembled together, in a particular embodiment, by means of opposing rows of magnets arranged on opposite adjacent surfaces of the front and rear detachable components, wherein said opposing rows of magnets have opposing poles. However, other suitable assembling mechanisms may be used in alternative embodiments such as:
- a combination of one or more rows of evenly distributed inserts protruding from at least one surface of either one or both of the components which are inserted into orifices arranged collinearly on an opposite adjacent surface of the other detachable component,
- a tongue-and-groove configuration in which the detachable components are assembled or disassembled by laterally sliding them together,
- one or more clasping elements arranged along at least one section of the wing where the detachable components are in contact with one another, or
- joining both detachable components through the use of multiple screws or bolts in combination with an equal number of nuts or other similar retaining elements, which are accessible from the outside through retractable panels installed on both components.

Other suitable mechanisms, not disclosed herein but which are known in the current state of the art and the use of which would be obvious to an expert, may also be used.

Furthermore, the front and rear detachable components may or may not be proportional in size, so that in a particular embodiments of the invention the rear detachable component is considerably larger than its counterpart, the front detachable component, or vice versa or they are both approximately the same size.

Due to the fact that the wings of the UAV are detachable, this allows the UAV to be easily assembled or disassembled, and therefore improves its transportability as it may be stored as independent components when it isn't being used.

In view of the wing configuration previously disclosed, the UAV is also characterised in that it is able to shift between a first flight mode and a second flight mode, so that in the first flight mode, each wing is assembled and arranged so that it can rotate freely around the rotating shaft onto which it has been assembled and having attached to it the rotor propeller, wherein the rotating shaft only serves as a guiding element and doesn't produce or cause any rotational movement which affects the rotation of the wing itself. In this first flight mode the wing is positioned or oriented according to a direction and strength of the wind (crossover wind) impinging against the surface area of the wing, as well as a downstream flow generated by the rotor propeller, which produces a rotary movement along the transversal longitudinal axis "X", and therefore the wings on either side of the fuselage may rotate independently from one another, around the rotating shaft on which they are assembled.

By allowing the wings to rotate freely around their rotating shaft, only due to a crossover wind impinging against the surface area of each wing and the downstream flow generated by the rotor propellers reduces the drag effect generated in conventional tilt-wing aircraft when the wing is rotated and left in a fixed position. By adjusting the angle of the rotor propellers, the UAV can determine an optimum flight course during hovering mode or vertical take-off and landing, also known as VTOL.

With regards to the second flight mode, each wing remains in a predetermined fixed position, for example in a transversal horizontal plane by means of a wing-locking mechanism, providing the UAV with a conventional lift drive caused in conventional forward flight. The cited wing-locking mechanism affords the wings a limited freedom of movement so that each wing may independently adjust their pitch angle around the longitudinal axis "X", transversal to the vehicle fuselage also known as the pitch axis, in order to:
- stabilise the aircraft, by simulating and achieving a similar effect caused by the presence of flight control surfaces included in the wings such as flaps and/or ailerons, which are not present in the disclosed invention, therefore simplifying the design of the wings used in the UAV and improving the aerodynamic properties of the wings by not disrupting their geometry;
- generate a rotational moment around the longitudinal axis "Y", also known as the roll axis of the aircraft, which affects the turning or change of direction of the UAV by banking or inclining towards the inside of a turning movement of the UAV, by increasing the lift of the one or more wings on one side of the fuselage with regards to the one or more wings on the other side of the fuselage; and/or
- modify an angle of a plane surface in relation to a horizontal stabiliser of an empennage or tail of the UAV, in order to further stabilise the UAV.

The wing-locking mechanism used in the second flight mode is preferably selected from a group comprising:
- an adjustable buffer positioned on either side of the fuselage, for each wing, which limits and retains the trailing edge of the rear detachable component of each wing, limiting the elevation of the wing due to a negative angular momentum generated by a lift effect;
- one or more magnetic limiting elements arranged along a path on the fuselage equivalent to the path done by the trailing edge of each wing, with a magnet of an opposite pole arranged on the trailing edge of the wing adjacent to the fuselage; or
- a mechanical retainer such as a pin, a bolt or an equivalent element which is optionally adjustable in height which is inserted into a cavity of a surface of the wing adjacent to the fuselage, near the trailing edge, so that when the mechanical retainer is inserted in the cavity it retains the wing in position at a fixed or a variable angle, the latter being the preferred option, due to the geometry of the cavity which may be slot shaped affording the mechanical retainer a certain freedom of movement.

However, other equivalent mechanisms which provide the same effect, not disclosed herein, may be used and should be considered equivalent.

In different embodiments of the present invention, each one of the at least one rotating shafts protruding from the fuselage has at least one port rotating shaft, and one starboard rotating shaft, so that a rotating shaft of the UAV is made up of either one port rotating shaft and one starboard rotating shaft forming one transversal rotating shaft, or so that the at least one port rotating shaft and said at least one starboard rotating shaft are independent from one another.

Furthermore, each one of the rotating shafts arranged on a particular embodiment of the UAV may be powered by either one actuator, or multiple independent actuators, so that each one of the independent actuators is associated with one rotating shaft or a port rotating shaft and a starboard rotating shaft which together form a rotating shaft with two different actuators.

The rotating shafts made up of one port rotating shaft and one starboard rotating shaft may be arranged either co-aligned or non-aligned on either side of the fuselage, and are arranged along the longitudinal axis "Y", or roll axis, along the centre of gravity of the UAV.

It should be noted that in different embodiments of the present invention, the rotor propellers on either side of the fuselage may rotate independently from one another according to the rotation of the rotating shaft on which they are installed, as well as if they are arranged on either the same rotating shaft or independent rotating shafts. Regardless of whether the rotor propellers of the UAV rotate independently from one another or not, they rotate between 0° and 90° with regards to a horizontal plane defined by the position of the wings in the second flight mode, where they are substantially horizontal and parallel to the ground.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative, in which.

DETAILED DESCRIPTION OF AN EMBODIMENT

Figure 1:
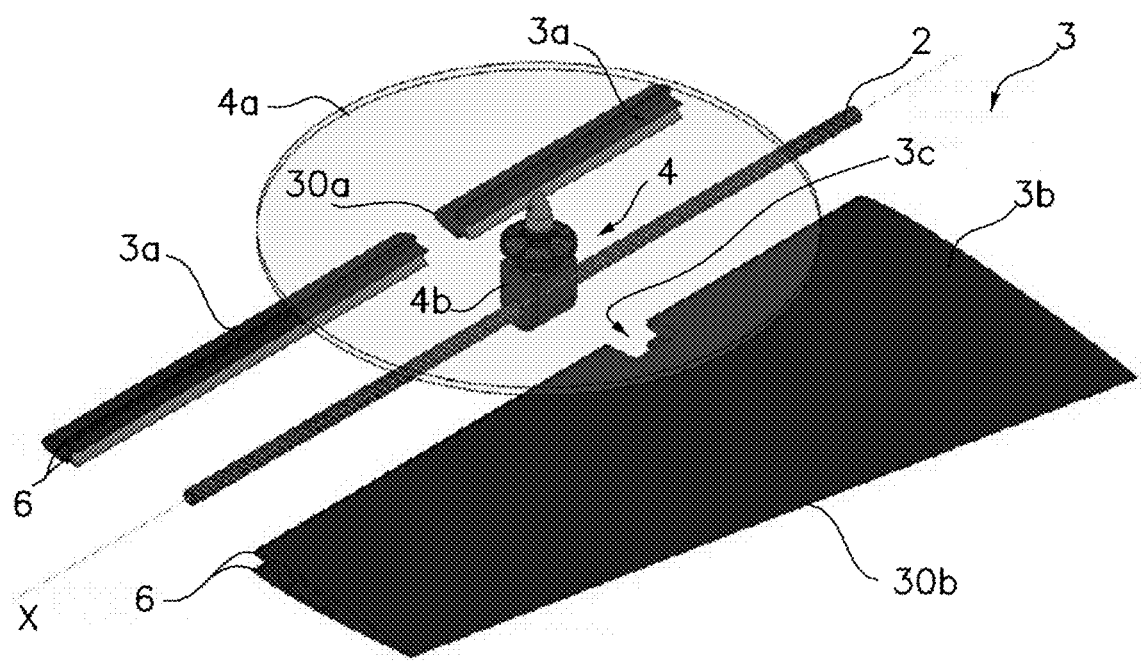
FIG. 1 is an exploded view of a port wing, illustrating the different components of a particular embodiment of a wing.

The foregoing and other advantages and features will be more fully understood from the following detailed description of an embodiment with reference to the accompanying drawings, to be taken in an illustrative and non-limitative manner, in which:

FIG. 1 illustrates the different components which together form a wing 3, specifically the port wing, in a particular embodiment of the UAV. The wing 3 is made up of a front detachable component 3a which defines a leading edge 30a of the wing 3, comprising two separate parts, and a rear detachable component 3b which defines a trailing edge 30b of the wing 3, comprising a single part. The two components, 3a and 3b, are assembled together around a rotating shaft 2, coaxial to a longitudinal axis "X" that is transversal to the aircraft fuselage 1, by means of opposing rows of magnets 6 arranged on opposite adjacent surfaces of the front and rear detachable components 3a, 3b, the opposing rows of magnets 6 having opposing poles. Furthermore, the front and rear detachable components 3a, 3b are assembled together leaving a cut-out portion or space 3c, so that a rotor propeller housing 4b of the rotor propeller 4 may rotate freely according to the rotation of the rotating shaft 2 on which it has been attached without risk of collision with the wing, 3, itself.

The rotor propeller 4 comprises a plurality of rotor blades 4a and a housing 4b or encasement installed on the rotating shaft 2 which includes the actuating means to power the rotor propeller 4, specifically the rotor blades 4a.

This description is also valid for the starboard wing, in this particular embodiment of the UAV. FIG. 2 and FIGS. 3a to 3c show a wing 3 of the UAV, according to the description included in FIG. 1, in different positions according to a second flight mode and a first flight mode of the UAV, respectively.

Figure 2:
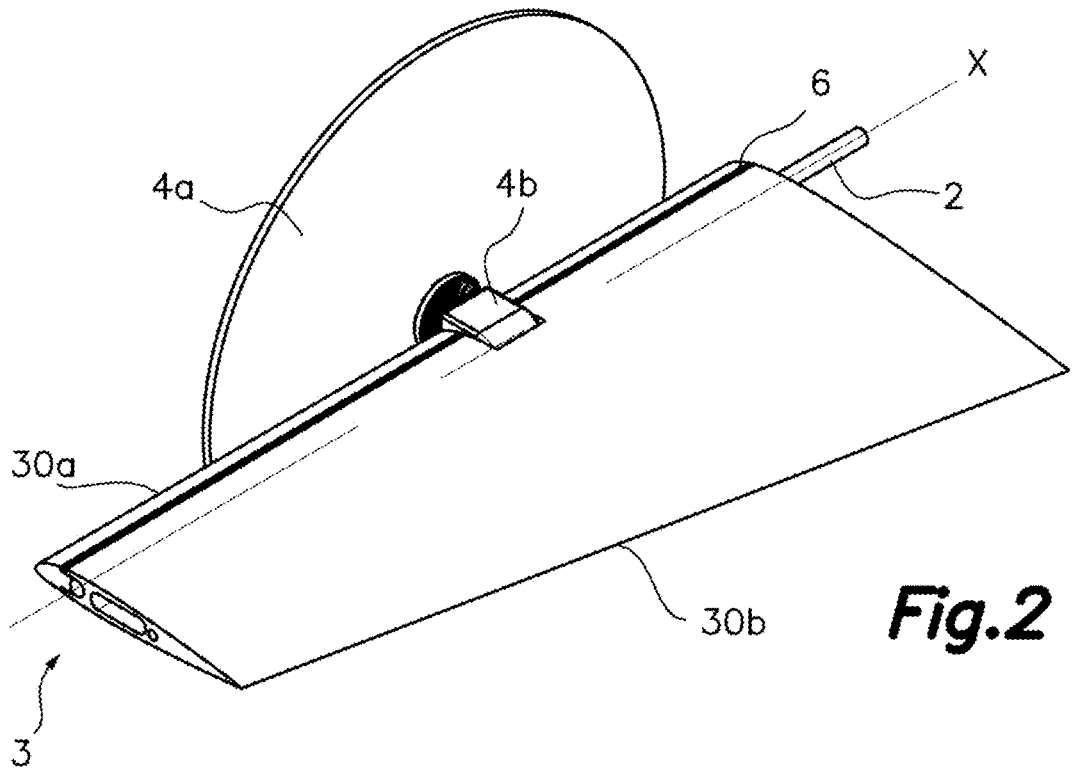
FIG. 2 illustrates a wing, as seen in FIG. 1, in a second flight mode, as a fixed wing.

FIG. 2 shows a wing 3 positioned in the second flight mode of the UAV, wherein the wing 3 of the UAV is fixed at a predetermined angular position due to a wing-locking mechanism (not shown in this figure as the fuselage 1 of the UAV isn't visible). In the second flight mode, the rotor propellers 4 are positioned in a substantially horizontal position, 0°, and therefore the UAV flies in a similar manner to a conventional forward flight aircraft.

Figure 3A:
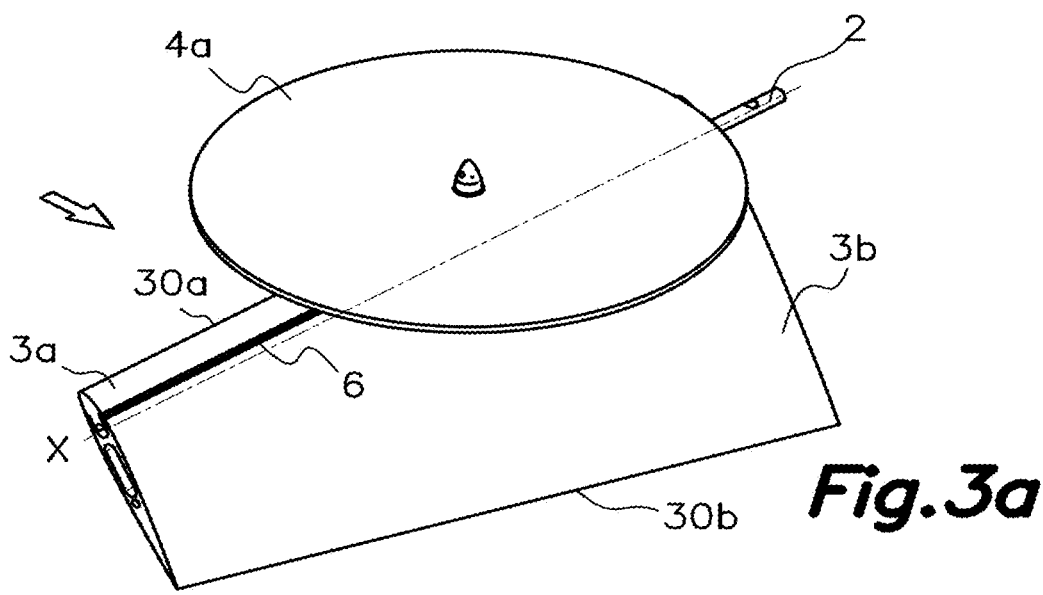
FIG. 3a to FIG. 3c illustrate different wing positions of a port wing, as seen in FIG. 1, when the UAV is in a first flight mode, as a rotary wing.
Figure 3B:
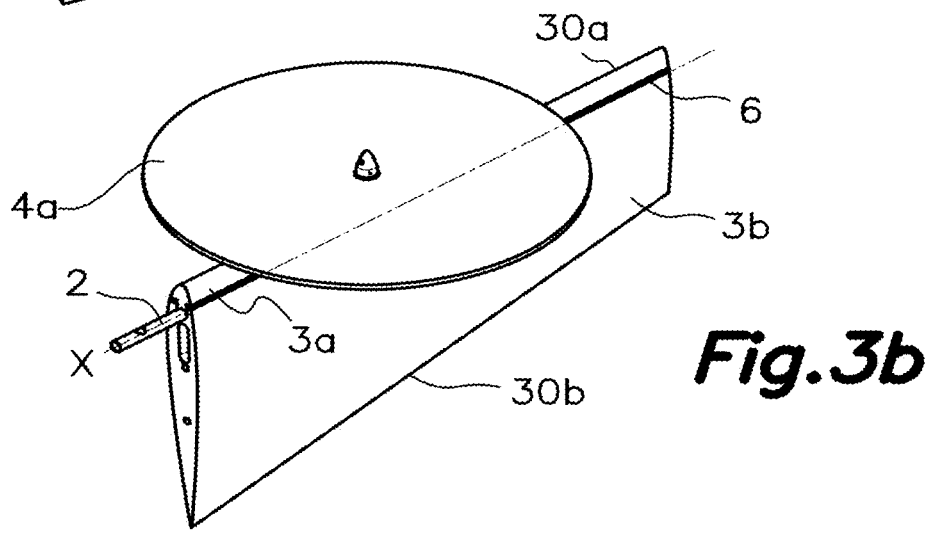
Figure 3C:
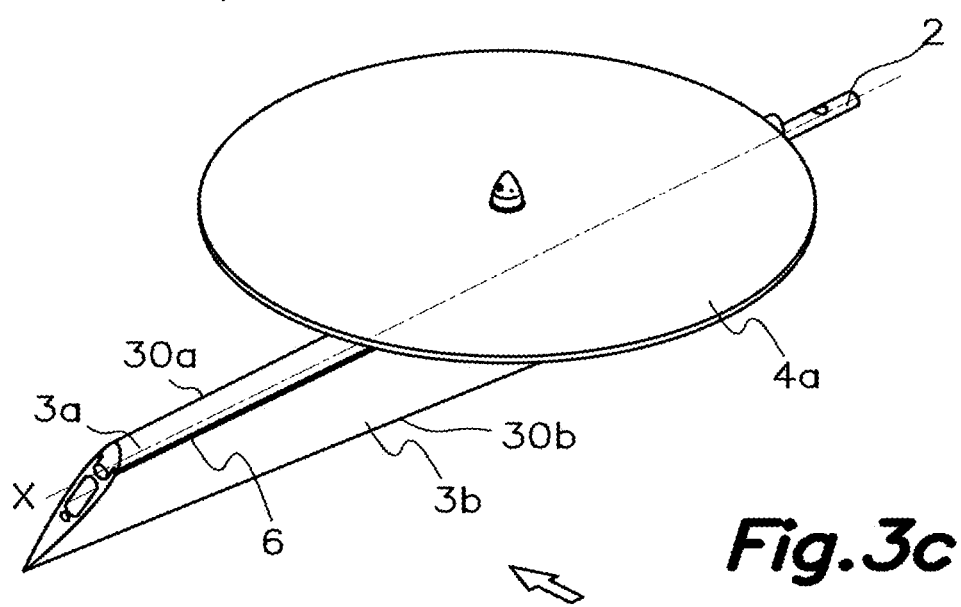

However, the wing positions illustrated in FIGS. 3a to 3c, are relevant to the first flight mode in which each wing 3 is arranged so as to rotate, tilt or revolve freely around the rotating shaft 2 wherein:

in FIG. 3a the wing 3 is positioned in such a manner due to a direction of the crossover or flow of wind (direction indicated with the arrow) impinging against the surface area of the wing 3, and therefore the wing 3 is pushed and repositioned after rotating around the transversal longitudinal axis "X", also known as pitch axis;

in FIG. 3b the wing 3 remains in place as the crossover or flow of wind which impinges against the surface area of the wing 3 is negligible and therefore doesn't affect the natural position of the wing in the first flight mode; and in FIG. 3c, the wing 3 is positioned according to the description of FIG. 3a, but in the opposite sense due to the direction, indicated with the arrow, of the crossover or flow of wind impinging against the surface area of the wing 3.

The rotor propellers 4 shown in FIGS. 3a to 3c, are positioned with the rotating blades 4a parallel to the ground, with the housing 4b at an angle of approximately 90°, therefore allowing the UAV to hover as well as vertical take-off and landing (VTOL).

Figure 4A:
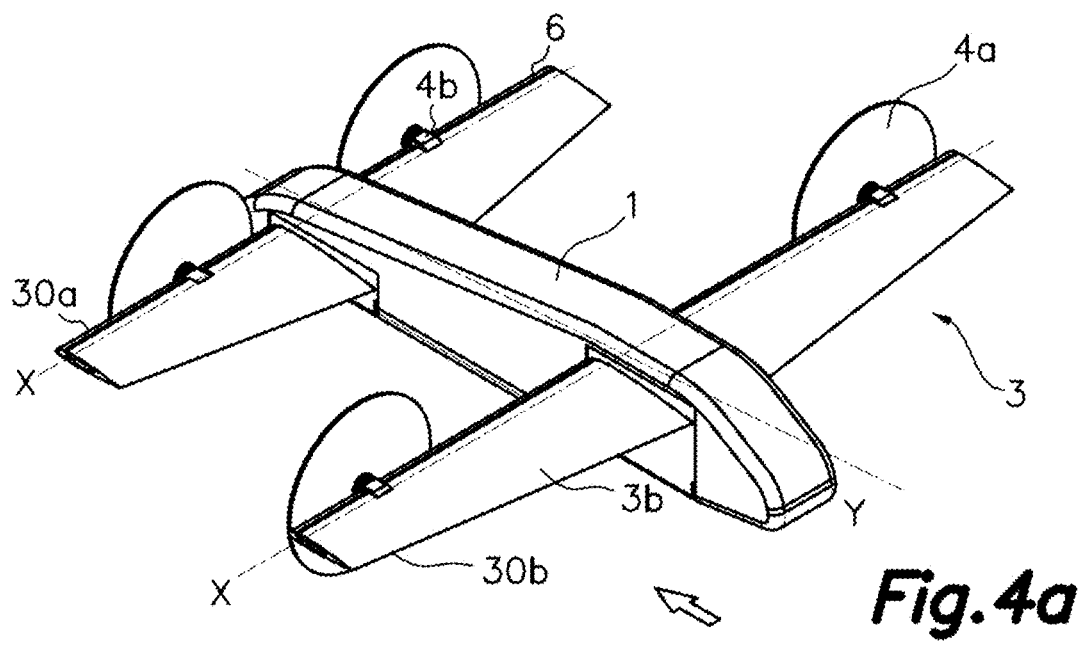
FIG. 4a and FIG. 4b illustrate, respectively, a particular embodiment of a UAV in a second flight mode and in a first flight mode in which the UAV has two wings on either side of the fuselage.
Figure 4B:
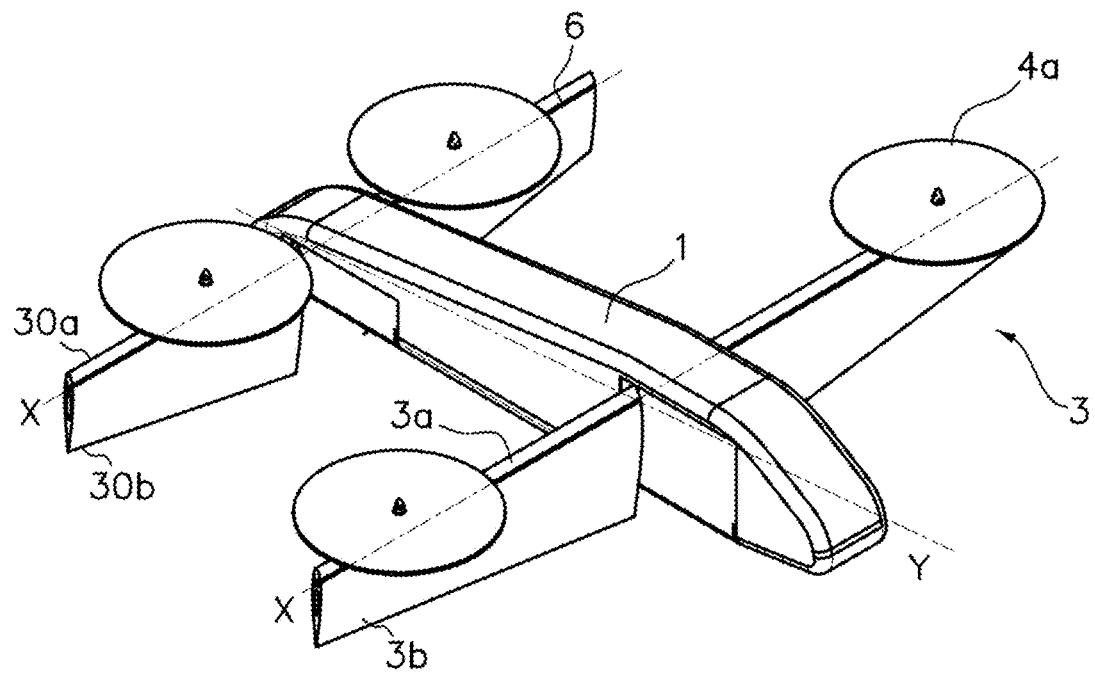

Both FIG. 4a and FIG. 4b illustrate a particular embodiment of a UAV, according to the information disclosed previously, in which the UAV has two wings 3 on either side of the fuselage 2, with the housing 4b of the rotor propeller 4, containing the driving means or actuator of the propeller 4, is arranged on the rotating shaft 2 of each wing 3.

In FIG. 4a this particular embodiment of the UAV is in the second flight mode, therefore the wings 3 are in a locked position in a substantially horizontal plane parallel to the ground, due to the wing-locking mechanism integrated in the fuselage 2, preferably in an area near the trailing edge 30b of the rear detachable components 3b of each wing 3. The rotor propellers 4 of each wing 3 are facing forwards, and are arranged in such a manner so that the downstream flow generated by the blades 4a of the rotor propellers 4 in the forward wings 3 does not substantially affect the rear wings 3.

On the other hand, FIG. 4b the UAV is in the first flight mode, and therefore the wings 3 are substantially perpendicular to the ground in a vertical disposition, due to negligible crossover winds, and the rotor propellers 4 are in hover mode. The position of the wings 3 may vary, as seen and described in FIGS. 3a to 3c, according to the direction and strength of the wind which strikes a surface area of the wings 3 as well as the downstream flow generated by the rotor blades 4a of the rotor propeller 4.

The unmanned aerial vehicle (UAV) or drone disclosed herein may be powered by means of one or more fuel cells, one or more batteries (preferably Lithium polymer batteries), or other alternative power sources which supply energy to one or more actuators, such as an electric motor or an electromechanical motor, installed in the fuselage 2.

The fuselage 2 may have any suitable aerodynamic shape and it may optionally include an empennage (also known as tail or tail assembly) at rear section of the fuselage 2 in order to further provide more stability to the UAV. The empennage may include one or more of either a vertical stabilising surface, a horizontal stabilising surface or both, which provide further control of the flight dynamics of the UAV, specifically yaw and pitch of the UAV.

Furthermore, for any particular embodiment of the present invention, the UAV may be configured to modify, switch or transition from the first flight mode to the second flight mode, or vice versa, either manually or automatically.

If the transition between the two flight modes is manual, the UAV pilot or UAV controller decides when the wings 3 are in an optimum position to be retained by the wing-locking mechanism, when the wings 3 are initially in the first flight mode arranged to rotate freely around a rotating shaft 2. The UAV pilot controls the tilt angle of the rotor propellers 4 by the one or more rotating shafts 2 protruding transversally from the fuselage 1, evaluates flight parameters and conditions and then decides if the wings 3 are positioned adequately to activate the wing-locking mechanism and retain the wings 3 in a substantially horizontal disposition, in the second flight mode. The UAV pilot can then determine when the UAV must transition from the second flight mode back to the first flight mode, and therefore deactivate the wing-locking mechanism.

However, if the transition between the two flight modes is automatic, thus the UAV is currently in an auto-pilot configuration, the transition between flight modes begins by tilting or modifying the angle of the rotor propellers 4 by rotating the one or more rotating shafts 2 and at the same time measuring and/or determining the speed of the UAV in relation to the wind as well as ensuring the performance of the UAV is still inside the performance envelope (also referred to as flight envelope) of the UAV. Once a minimum speed, associated to each flight mode, has been attained the rotor propellers 4 are ultimately positioned according to either the first flight mode or the second flight mode according to the flight transition that is taking place. The wings 3 are positioned due to a momentum/lift effect which modifies their position in the first flight mode, until they are at a substantially horizontal position in which the wing-locking mechanism is activated and the UAV has transitioned to the second flight mode.

It will be understood that various parts of one embodiment of the invention can be freely combined with parts described in other embodiments, even being said combination not explicitly described, provided there is no harm in such combination.

The invention claimed is:

1. An unmanned aerial vehicle comprising:
   a fuselage,
   at least one rotating shaft protruding from both sides of said fuselage,
   at least one rotor propeller, comprising one or more rotor blades (4a) and a housing (4b) arranged on said rotating shaft on either side of said fuselage, and
   at least one wing on either side of the fuselage positioned on said rotating shaft, the at least one wing being made up of front and rear detachable components mounted around said at least one rotating shaft, the front and/or rear detachable components including a cut-out portion,
   the unmanned aerial vehicle being configured to shift between:
   a first flight mode using rotatable wings in which each wing is arranged so as to rotate freely around the at least one rotating shaft, and the wing is oriented due to a direction and strength of the wind impinging against a surface area of the wing as well as a downstream flow generated by the rotor propeller, and
   a second flight mode using fixed wings in which each wing remains in a predetermined fixed position by means of a wing-locking mechanism,
   whereby the housing of the at least one rotor propeller is configured to rotate freely in conjunction with the rotation of the at least one rotating shaft between the first and second flight modes.

2. The unmanned aerial vehicle according to claim 1, wherein in the first flight mode the at least one wing on either side of the fuselage rotate independently from one another, around the at least one rotating shaft.

3. The unmanned aerial vehicle according to claim 1, wherein in the second flight mode each of said at least one wing may independently adjust a pitch angle in order to:
   stabilize the aircraft,
   stabilize a bank angle around a longitudinal axis "Y", and/or
   modify an angle of a plane surface in relation to a horizontal stabiliser of an empennage.

4. The unmanned aerial vehicle according to claim 1, wherein the at least one rotating shaft protruding from the fuselage has at least, one port rotating shaft, and one starboard rotating shaft, and said at least one port rotating shaft and said at least one starboard rotating shaft are independent from one another.

5. The unmanned aerial vehicle according to claim 4, wherein the at least one port rotating shaft and the at least one starboard rotating shaft are powered by:
   one actuator, or
   multiple independent actuators, wherein each independent actuator is associated with one rotating shaft.

6. The unmanned aerial vehicle according to claim 4, wherein the at least one port and the at least one starboard rotating shafts are arranged either co-aligned or non-aligned on either side of the fuselage, and are arranged on or proximal to the centre of gravity of the unmanned aerial vehicle.

7. The unmanned aerial vehicle according to claim 1, wherein the at least one rotating shafts are either co-aligned or non-aligned on either side of the fuselage, and are arranged on or proximal to the centre of gravity of the unmanned aerial vehicle.

8. The unmanned aerial vehicle according to claim 1, wherein said front and rear detachable components are assembled together by means of opposing rows of magnets arranged on opposite adjacent surfaces of the front and rear detachable components, wherein said opposing rows of magnets have opposing poles.

9. The unmanned aerial vehicle according to claim 1, wherein the rotor propellers on either side of the fuselage rotate independently from one another.

10. The unmanned aerial vehicle according to claim 1, wherein the rotor propellers rotate between 0° and 90° with regards to a plane defined by said predetermined position of each wing in the second flight mode.

11. The unmanned aerial vehicle according to claim 1, wherein the front detachable component defines a leading edge of each wing and the rear detachable component defines a trailing edge of each wing.

12. The unmanned aerial vehicle according to claim 11, wherein the detachable components are not proportional in size.

13. The unmanned aerial vehicle according to claim 1, wherein said wing-locking mechanism used in the second flight mode is selected from a group comprising:

an adjustable buffer positioned on either side of the fuselage, for each wing, which limits and retains the trailing edge of the rear detachable component of each wing, limiting the elevation of the wing due to a negative angular momentum generated by a lift effect;

one or more magnetic limiting elements arranged along a path on the fuselage equivalent to the path done by the trailing edge of each wing, with a magnet of an opposite pole arranged on the trailing edge of the wing adjacent to the fuselage; or a slidable mechanical retainer which is inserted into a cavity of a surface of the wing adjacent to the fuselage, retaining each wing in a predetermined position at a fixed or a variable angle.

14. The unmanned aerial vehicle according to claim 9, wherein the rotor propellers rotate between 0° and 90° with regards to a plane defined by said predetermined position of each wing in the second flight mode.

* * * * *